US012513467B2

(12) United States Patent
Barsukou

(10) Patent No.: US 12,513,467 B2
(45) Date of Patent: Dec. 30, 2025

(54) ACOUSTIC RESISTANCE IMPROVEMENT IN PIEZOELECTRIC MICROELECTROMECHANICAL SYSTEM MICROPHONE USING COMPLIANT JOINT

(71) Applicant: SKYWORKS SOLUTIONS, INC., Irvine, CA (US)

(72) Inventor: Siarhei Dmitrievich Barsukou, Takarazuka (JP)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 164 days.

(21) Appl. No.: 18/055,898

(22) Filed: Nov. 16, 2022

(65) Prior Publication Data

US 2023/0188896 A1 Jun. 15, 2023

Related U.S. Application Data

(60) Provisional application No. 63/265,177, filed on Dec. 9, 2021.

(51) Int. Cl.

| | |
|---|---|
| ***H04R 7/06*** | (2006.01) |
| ***H04R 1/04*** | (2006.01) |
| ***H04R 7/18*** | (2006.01) |
| ***H04R 17/02*** | (2006.01) |

(52) U.S. Cl.

CPC ................. *H04R 7/06* (2013.01); *H04R 1/04* (2013.01); *H04R 7/18* (2013.01); *H04R 17/02* (2013.01); *H04R 2499/11* (2013.01)

(58) Field of Classification Search

CPC ... H04R 7/06; H04R 1/04; H04R 7/18; H04R 17/02; H04R 2499/11

See application file for complete search history.

(56) References Cited

U.S. PATENT DOCUMENTS

2022/0232328 A1* 7/2022 Mawatari ............. H04R 29/004
2022/0279285 A1* 9/2022 Kuchiji .................. H04R 17/02
2022/0303693 A1* 9/2022 Ikeuchi .................. H04R 17/02
2023/0349862 A1* 11/2023 Zhou ...................... H04R 19/04
(Continued)

FOREIGN PATENT DOCUMENTS

JP 2020178109 A * 10/2020
WO WO-2021131528 A1 * 7/2021 .............. H04R 1/04

OTHER PUBLICATIONS

"MEMS microphone mechanical & acoustical implementation," Infineon, AN557, Apr. 2018, 20 pages.
(Continued)

*Primary Examiner* — Mark Fischer
(74) *Attorney, Agent, or Firm* — Lando & Anastasi, LLP

(57) ABSTRACT

A piezoelectric microelectromechanical system microphone comprises a support substrate, a cantilever sensing element including a piezoelectric material attached to the support substrate and configured to deform and generate an electrical potential responsive to impingement of sound waves on the cantilever sensing element the cantilever sensing element divided into a plurality of cantilevers having gaps between side edges of adjacent cantilevers, and a compliant material disposed in at least a portion of the gaps between adjacent cantilevers to improve the performance of the piezoelectric microelectromechanical system microphone.

18 Claims, 18 Drawing Sheets

(56) References Cited

U.S. PATENT DOCUMENTS

2023/0363280 A1 * 11/2023 Sakai .................. H10N 30/853

OTHER PUBLICATIONS

Feiertag et al., "Determining the acoustic resistance of small sound holes for MEMS microphones," SciVerse ScienceDirect, Procedia Engineering 25 (2011), pp. 1509-1512.

Yamashita et al., "Diaphragm deflection control of piezoelectric ultrasonic microsensors for sensitivity improvement," ScienceDirect, Sensors and Actuators A 139 (2007), pp. 118-123.

* cited by examiner

ACOUSTIC RESISTANCE IMPROVEMENT IN PIEZOELECTRIC MICROELECTROMECHANICAL SYSTEM MICROPHONE USING COMPLIANT JOINT

CROSS-REFERENCE TO RELATED APPLICATIONS

This application claims priority under 35 U.S.C. § 119(e) to U.S. Provisional Patent Application Ser. No. 63/265,177, titled "ACOUSTIC RESISTANCE IMPROVEMENT IN PIEZOELECTRIC MICROELECTROMECHANICAL SYSTEM MICROPHONE USING COMPLIANT JOINT," filed Dec. 9, 2021, the entire contents of which is incorporated herein by reference for all purposes.

BACKGROUND

Technical Field

Embodiments disclosed herein relate to piezoelectric microelectromechanical system microphones and to devices including same.

Description of Related Technology

A microelectromechanical system (MEMS) microphone is a micro-machined electromechanical device to convert sound pressure (e.g., voice) into an electrical signal (e.g., voltage). MEMS microphones are widely used in mobile devices such as cellular telephones, headsets, smart speakers, and other voice-interface devices/systems. Capacitive MEMS microphones and piezoelectric MEMS microphones (PMMs) are both available in the market. PMMs requires no bias voltage for operation, therefore, they provide lower power consumption than capacitive MEMS microphones. The single membrane structure of PMMs enable them to generally provide more reliable performance than capacitive MEMS microphones in harsh environments. Existing PMMs are typically based on either cantilever MEMS structures or diaphragm MEMS structures.

SUMMARY

In accordance with one aspect, there is provided a piezoelectric microelectromechanical system microphone. The piezoelectric microelectromechanical system microphone comprises a support substrate, a membrane including a piezoelectric material attached to the support substrate and configured to deform and generate an electrical potential responsive to impingement of sound waves on the membrane, the membrane divided into a plurality of cantilevers having gaps between side edges of adjacent cantilevers, and a compliant material disposed in at least a portion of the gaps between adjacent cantilevers to improve the performance of the piezoelectric microelectromechanical system microphone.

In some embodiments, the compliant material extends fully across the portion of the gaps between the adjacent cantilevers and forms compliant joints between the adjacent cantilevers.

In some embodiments, at least a portion of the gaps between the adjacent cantilevers does not include the compliant material.

In some embodiments, the compliant material is disposed within between 50% and 90% of the total area of the gaps between the adjacent cantilevers.

In some embodiments, a ventilation hole not including the compliant material is defined proximate a center of the membrane.

In some embodiments, the compliant material is a polymeric material.

In some embodiments, the compliant material includes one of polydimethylsiloxane, silicone glue, resin, or epoxy.

In some embodiments, the compliant material has a substantially same height as the membrane.

In some embodiments, the compliant material has a profile that decreases in thickness from edges of the adjacent cantilevers toward centers of the gaps between the adjacent cantilevers.

In some embodiments, the compliant material has a profile defining a notch about centers of the gaps between the adjacent cantilevers.

In some embodiments, the compliant material is in the form of a film coupled to one of fronts or rears of sides edges of the adjacent cantilevers.

In some embodiments, the film is corrugated.

In some embodiments, the compliant material is a metal film.

In some embodiments, the film is coupled to one of fronts or rears of sides edges of the adjacent cantilevers.

In some embodiments, the film is corrugated.

In some embodiments, the piezoelectric microelectromechanical system microphone exhibits a −3 dB roll-off frequency of about 20 Hz or less.

In some embodiments, the piezoelectric microelectromechanical system microphone is included in an electronics device module.

In some embodiments, the electronic device module is included in an electronic device.

In some embodiments, the electronic device module is included in a telephone.

In accordance with another aspect, there is provided a method of forming a piezoelectric microelectromechanical system microphone. The method comprises attaching a membrane including a piezoelectric material to a support substrate, the membrane configured to deform and generate an electrical potential responsive to impingement of sound waves on the membrane, the membrane divided into a plurality of cantilevers having gaps between side edges of adjacent cantilevers, and disposing a compliant material in at least a portion of the gaps between adjacent cantilevers to improve the performance of the piezoelectric microelectromechanical system microphone.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1A:
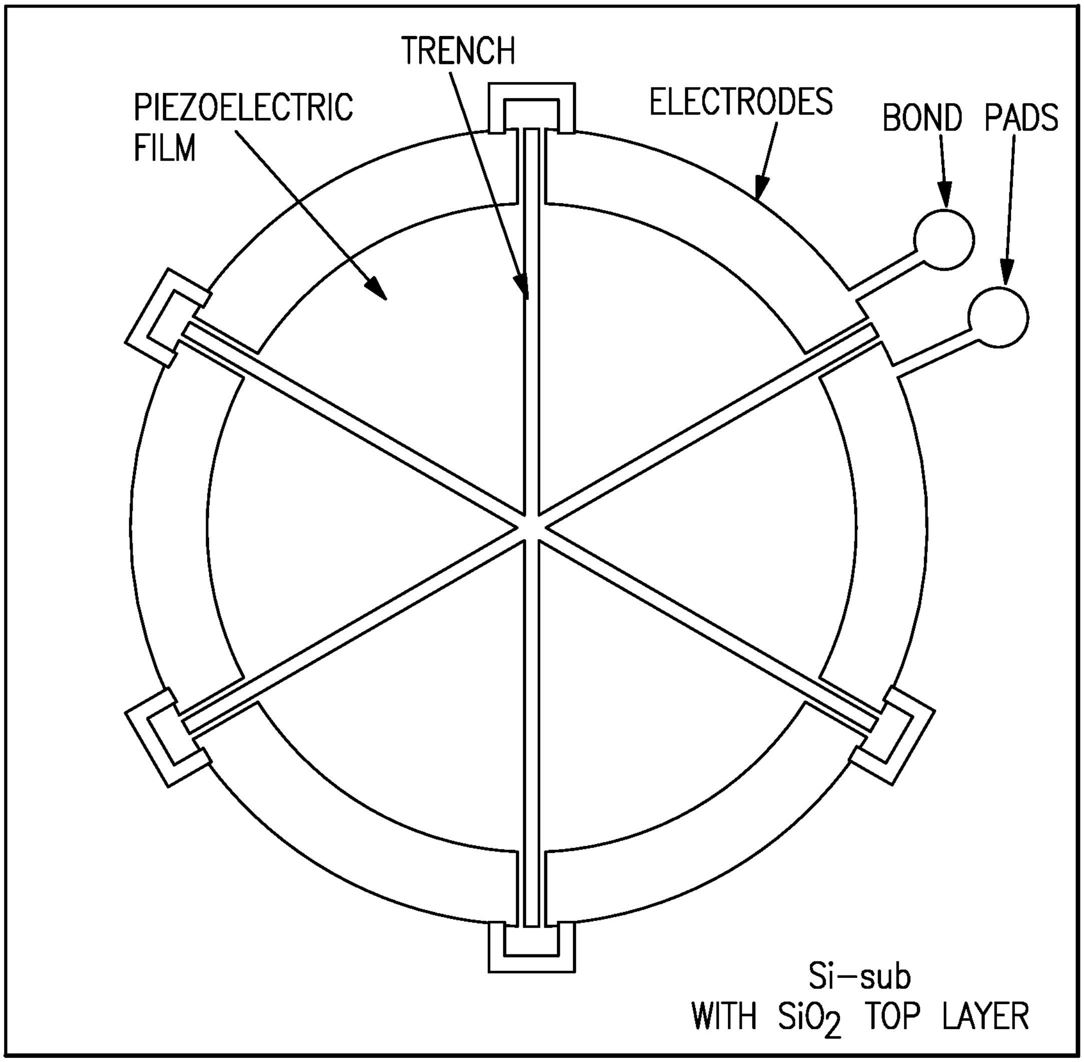
FIG. 1A is a plan view of an example of a cantilever piezoelectric microelectromechanical system microphone (PMM)

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Aspects and embodiments disclosed herein involve engineering of the gaps between adjacent cantilevers of a cantilever piezoelectric microelectromechanical system microphone (PMM) to improve the sensitivity of the microphone.

Figure 1B:
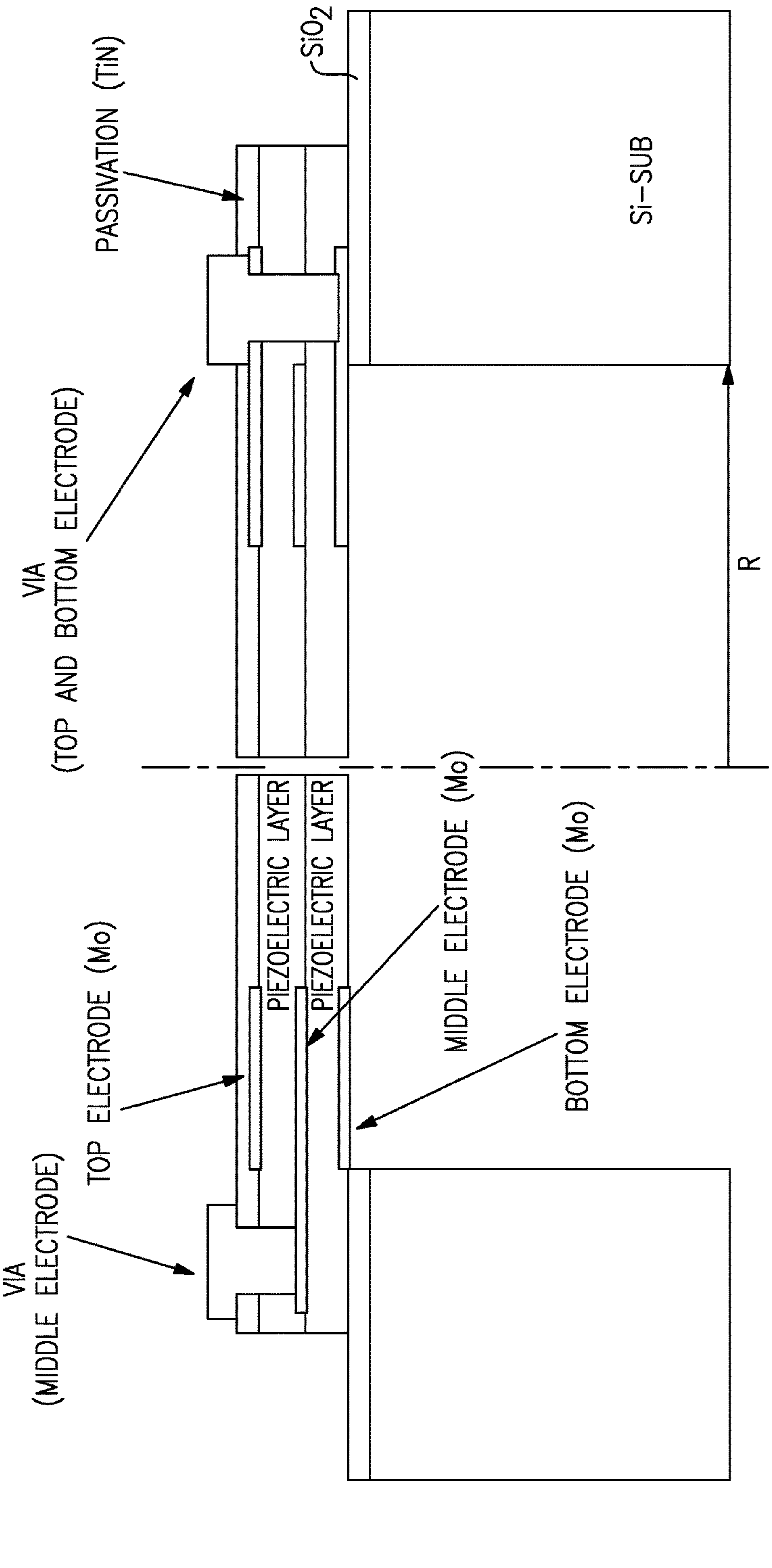
FIG. 1B is a cross-sectional view of the cantilever PMM of FIG. 1A.
Figure 1C:
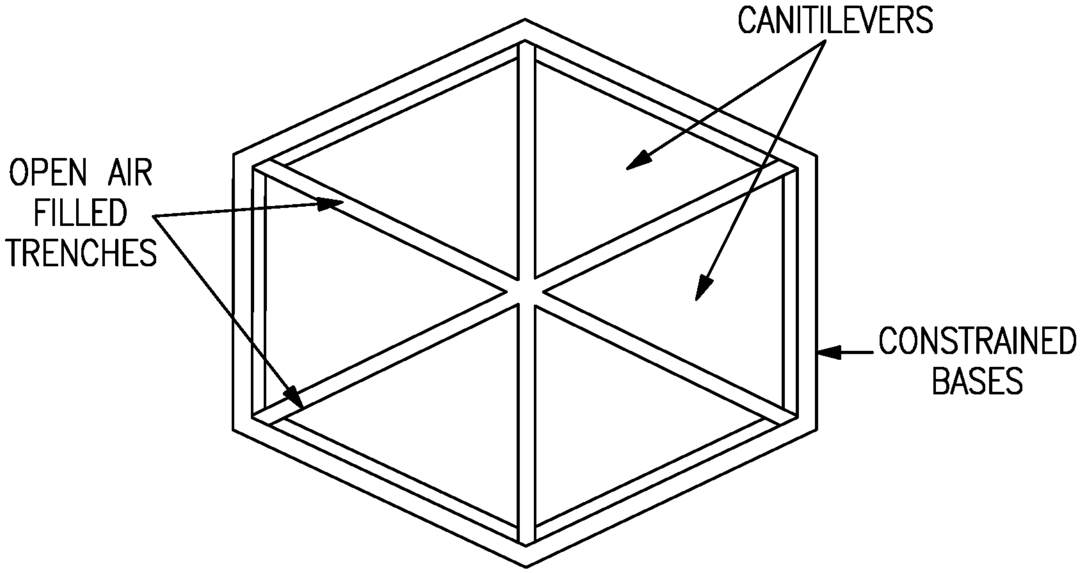
FIG. 1C is a plan view of another example of a cantilever PMM.

One example of a cantilever PMM is illustrated in a plan view in FIG. 1A and in a cross-sectional view in FIG. 1B. The cantilever PMM includes six cantilevers and top, middle, and bottom sensing/active electrodes proximate the bases of the cantilevers. Cantilever MEMS microphone structures generate the maximum stress and piezoelectric charges near the edge of the anchor portion of the cantilever structure. Therefore, partial sensing electrodes near the anchor may be used for maximum output energy. The cantilevers are pie-piece shaped and together form a circular microphone structure with trenches (gaps) between adjacent cantilevers. It should be appreciated that in alternate embodiments, the cantilever structures could be shaped other than as illustrated, for example, as polygons with three or more straight or curved sides. One example of a cantilever PMM shaped as a hexagon with six cantilevers is illustrated in FIG. 1C. The electrodes and other details are omitted from FIG. 1C for clarity.

The cantilevers of a cantilever PMM as disclosed herein may have bases mounted on a support substrate including a $SiO_2$ layer on a Si substrate as illustrated in FIG. 1B. The top, bottom, and middle sensing/active electrodes in the different cantilevers are connected in series between the bond pads, except for the cantilevers having electrical connection between the electrodes and bond pads. The top and bottom electrodes of each cantilever are electrically connected to the middle electrode in an adjacent cantilever. Vias to the middle electrode of one cantilever and to the top and bottom electrodes of an adjacent cantilever are used to provide electrical connection between the bond pads and cantilever electrodes. The electrodes are indicated in FIG. 1B as being Mo but could alternatively be Ru or any other suitable metal, alloy, or non-metallic conductive material.

In some embodiments, the layer of $SiO_2$ on the surface of the support substrate upon which the cantilevers formed by the stack of piezoelectric material and electrodes of a PMM is disposed may have a thickness of from about 1 μm to about 5 μm. As illustrated in FIGS. 1A and 1B, the support substrate including the Si substrate and layer of $SiO_2$ typically extends outward beyond the periphery of the PMM piezoelectric material cantilevers. The layer of $SiO_2$ constrains the periphery of the PMM cantilevers.

Figure 2:
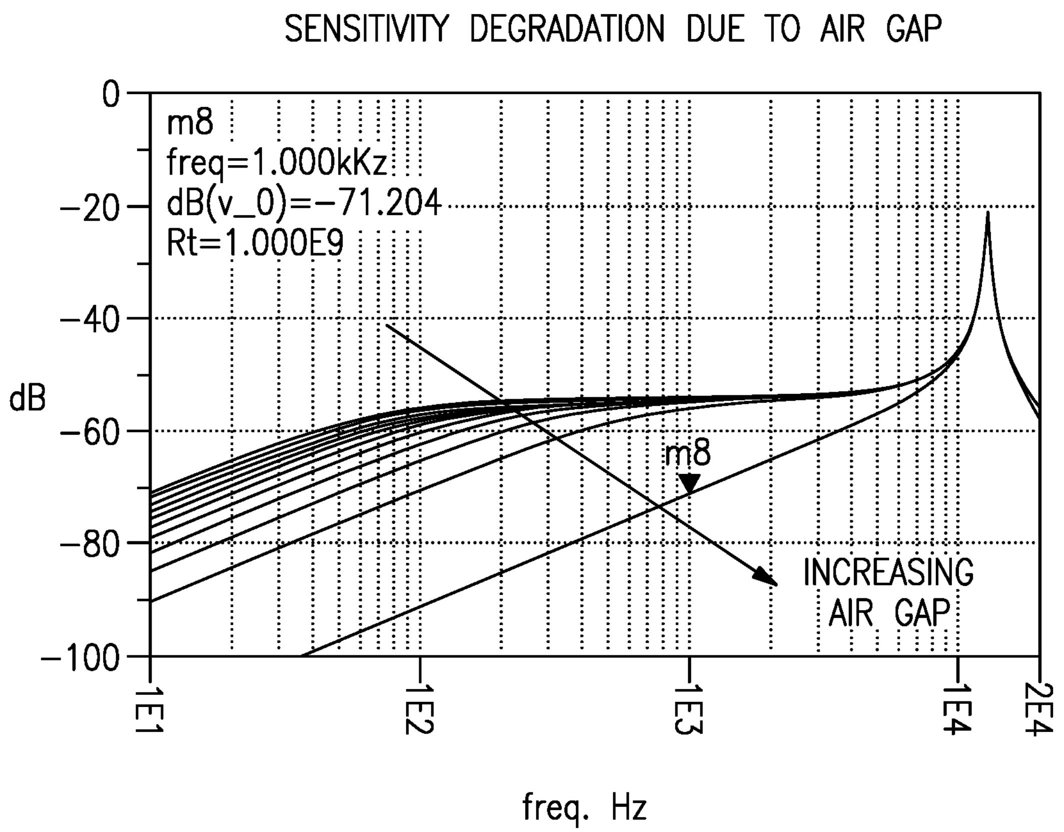
FIG. 2 illustrates how the sensitivity of a cantilever PMM in a low frequency range may decrease with increase in the size of the gaps between adjacent cantilevers.

The trenches between adjacent cantilevers of a cantilever PMM, also referred to as gaps or cavities herein, provide for the cantilevers to move independently from one another responsive to the impingement of sound waves on the cantilevers. Open trenches between adjacent cantilevers also provide for the flow of air from the front of the PMM to a backside cavity of the PMM, for example, the open space below the piezoelectric layers and electrodes and the inner sides of the support substrate in the example of FIG. 1B. As the terms are used herein, the front of the PMM piezoelectric material/electrode stack is the surface upon which sound from the external environment impinges during use and the back is the side facing the cavity in the PMM package. In some examples, the backside cavity of a PMM may be sealed. The flow of air through the trenches between adjacent cantilevers allows for the equalization of pressure between the front of the cantilevers and the backside cavity, preventing a buildup of static or dynamic pressure in the backside cavity that might inhibit movement of the cantilevers and reduce sensitivity of the PMM. Too large of an air gap between adjacent cantilevers, however, may reduce the sensitivity of the PMM, especially at lower frequencies, a phenomenon referred to as −3 dB roll-off. The frequency below which the sensitivity of a cantilever PMM exhibits degradation by 50% is referred to as the −3 dB roll-off frequency. It is generally desirable for a PMM to exhibit as low a −3 dB roll-off frequency as possible to achieve linear frequency response within a low frequency range. FIG. 2 illustrates schematically how the −3 dB roll-off frequency of a cantilever PMM increases with increasing air gap between cantilevers. It is sometimes difficult to control the air gap between cantilevers in a cantilever PMM (and thus the −3 dB roll-off frequency) due to process limitations, especially if PMM includes many separated cantilever elements. For example, residual stresses that may vary from one device to another may be generated in multilayer fabrication process. The residual stresses, when released, cause deflection and bending of cantilever structure.

In some embodiments, the overall sensitivity of a cantilever PMM may be increased and the variability in −3 dB roll-off frequency between different cantilever PMMs as a result of manufacturing variability may be decreased by at least partially filling the gaps between adjacent cantilevers with a compliant material. An example of this is schematically illustrated in plan view in FIG. 3. Using a compliant material for joining the separate adjacent cantilevers at their lateral sides may provide for an increase in the acoustic resistance and increased sensitivity of the PMM. Simultaneously the −3 dB roll-off frequency may be improved (reduced) as the amount of air gap between the cantilevers is reduced. Prospective materials for the compliant support material include isotropic high compliant materials such as polydimethylsiloxane (PDMS), silicone glue, resin, low viscosity epoxy resin, thin films of metal, etc.

Figure 3:
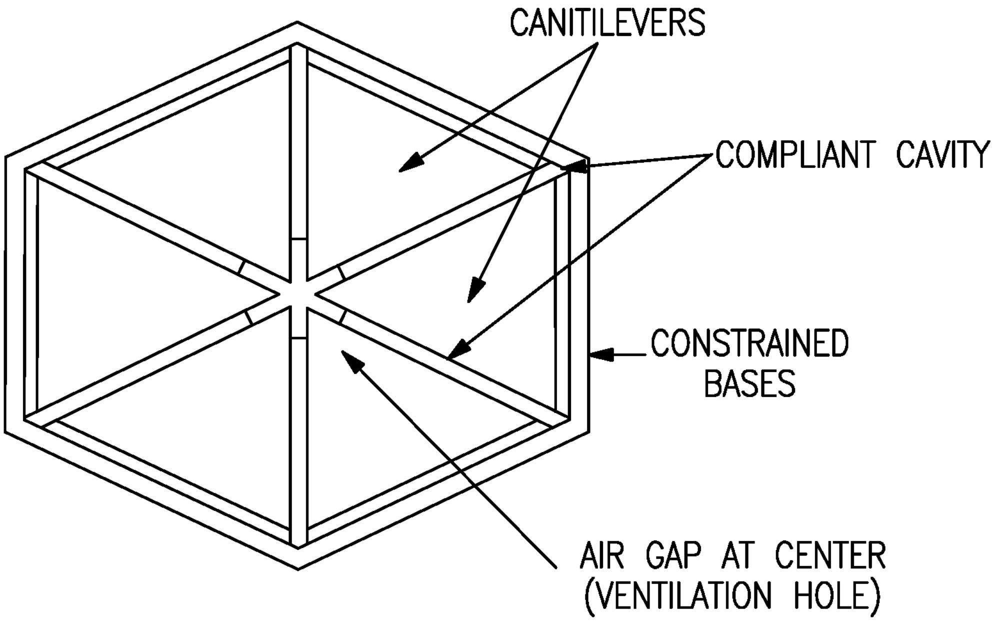
FIG. 3 schematically illustrates an example of a cantilever PMM with a compliant material disposed within portions of gaps between adjacent cantilevers.

The compliant material may not fill the entirety of the gaps between the cantilevers. Rather, as illustrated in FIG. 3 a portion of the gaps remain open to allow for air flow from the front to the back cavity of the PMM to avoid static pressure accumulation in the back cavity that may lead to reduction in sensitivity of the PMM. The open portion(s) of the gaps between cantilevers are optionally at or proximate the center of the PMM as illustrated in FIG. 3 but may additionally or alternatively be proximate the bases of the cantilevers or at any position(s) along the sides of the cantilevers. The amount of the gaps between cantilevers filled with the compliant material may vary based upon desired performance characteristics for different implementations. The amount of the gaps between cantilevers filled with the compliant material may be between 10% and 90%, between 25% and 75%, between 33% and 66%, approximately 90%, approximately 75%, or approximately 50% of the total area of the gaps between the cantilevers.

The joint between adjacent cantilevers formed of the compliant material should not degrade the deflection of the cantilevers due to the exposure of the PMM to sound so the total compliance of the PMM is not degraded. The compliant material should be light so that inclusion of the compliant material does not significantly reduce the resonant frequency of the PMM due to a mass loading effect. This is because the resonant frequency of the PMM often defines the upper limit of frequency to which the PMM is sensitive, and in some embodiments is desirably close to 20 kHz to correspond to the upper limit of audio frequency that most people can perceive. The compliant material desirably exhibits low viscosity (viscous loss) and does not degrade sensitivity of the PMM at high frequencies. In use the compliant material would experience mainly lateral stretching. The remaining air gap, optionally at the center region (the ventilation hole illustrated in FIG. 3) may be sized based on optimization of the frequency response of the PMM when packaged.

Advantages of including the compliant material in the gaps between cantilevers in a cantilever PMM include sensitivity improvement, in some examples by 1-2 dB as compared to a similar cantilever PMM lacking the compliant material, for example, due to slightly expanded sensing area of the PMM including a compliant joint, improvement in −3 dB roll-off frequency, improvement in thermal stability of the frequency response of the PMM because deflection of the cantilevers due to thermal expansion may be compensated via stretching of the compliant joint, signal to noise ratio (SNR) improvement as the result of the increase in acoustic resistance of the PMM cantilevers, and improved resistance to pressure shock drop tests due to the joining of separated cantilevers and the mechanical soft coupling between them.

Figure 4A:
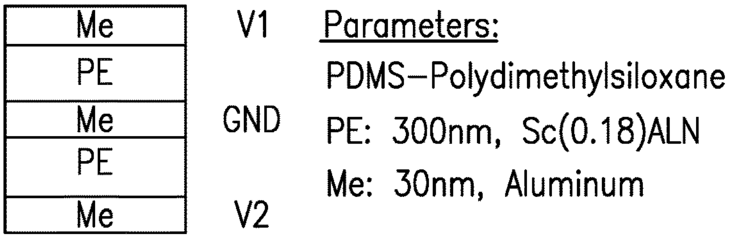
FIG. 4A illustrates the piezoelectric material and electrode stack in a cantilever of a simulated cantilever PMM.
Figure 4B:
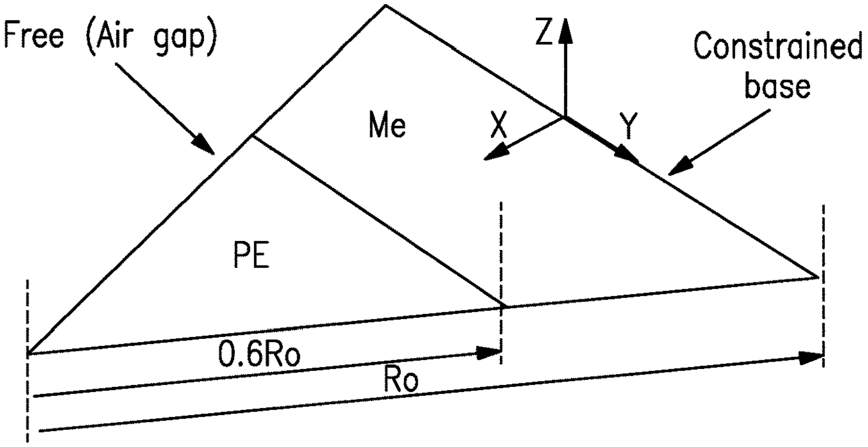
FIG. 4B is a representation of a conventional cantilever with no complaint material in the gap between adjacent cantilevers.
Figure 4C:
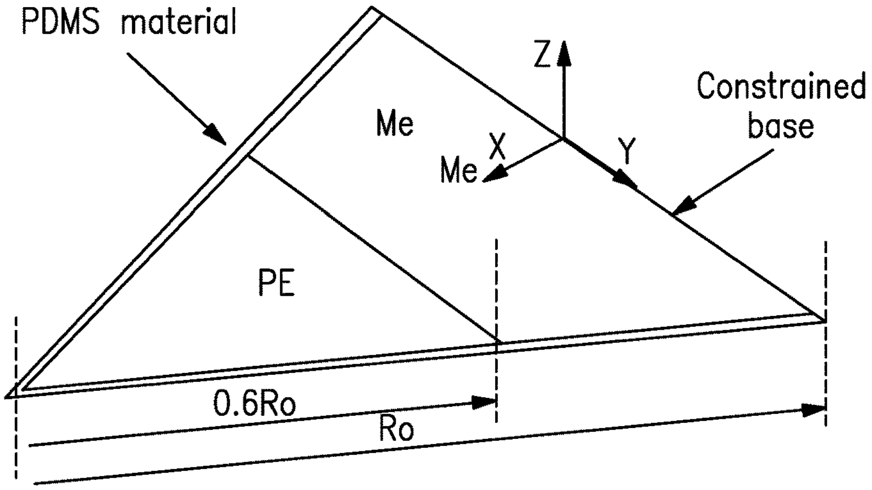
FIG. 4C is a representation of a cantilever with a complaint material forming a compliant joint in a portion of the gap between adjacent cantilevers.

Simulations were performed to investigate how inclusion of the compliant material in the gaps between cantilevers in a cantilever PMM would affect performance characteristics of the PMM, for example, displacement of the cantilevers and output voltage under a given sound pressure. Cantilevers were modeled with a structure including two piezoelectric material layers (PE) and three electrode layers (Me) as illustrated in FIG. 4A. The piezoelectric material layers were modeled as 300 nm thick layers of AlN doped with 18 atomic percent scandium. The electrodes were modeled as 30 nm thick layers of Al. The compliant material was modeled as being polydimethylsiloxane (PDMS) with a width of 2 μm (gap width between cantilevers of 2 μm). A simulated acoustic signal at 1 kHz and 1 Pa of pressure was utilized. The electrodes were modeled as being present in the outside 40% of the length $R_0$ ($R_0$=400 μm) of the sides of the cantilevers, with the inner 60% of the cantilevers not including electrodes. A representation of the modeled conventional cantilever with no complaint material in the gap between adjacent cantilevers is shown in FIG. 4B and a representation of the modeled cantilever with compliant joints is shown in FIG. 4C.

Figure 4D:
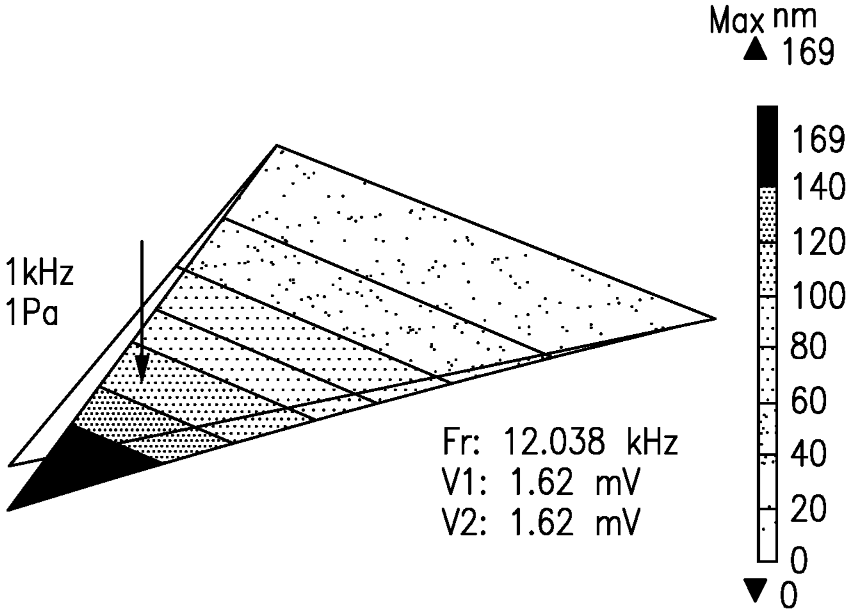
FIG. 4D illustrates simulation results of displacement for a PMM cantilever with free edges.
Figure 4E:
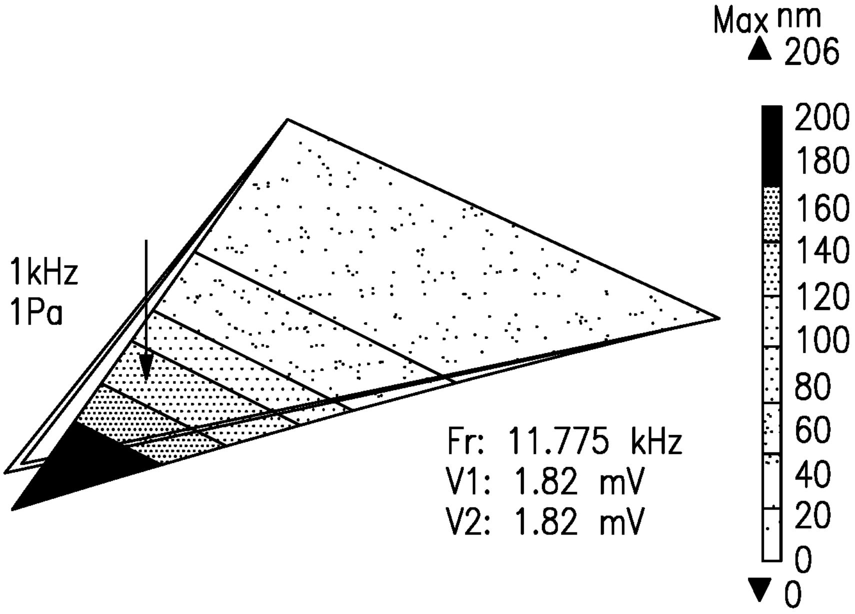
FIG. 4E illustrates simulation results for displacement for a PMM cantilever with compliant joints.

The simulation produced outputs including displacement of the cantilevers, first voltages V1 across the middle and top electrodes, second voltages V2 across the middle and lower electrodes, and resonant frequencies of the cantilevers. Simulation results of displacement for a PMM cantilever with free edges are illustrated in FIG. 4D and simulation results for displacement for the PMM cantilever with the PDMS material in the gap region (the compliant joint) is illustrated in FIG. 4E. From these results it can be seen that including the PDMS in the gap regions of the cantilever increased the displacement of the tip of the cantilever to 206 nm as compared to a displacement of 169 nm of the tip of the cantilever with the fee edges. This increased displacement of the cantilever with the compliant joint resulted in increased output voltages V1, V2 of 1.82 mV as compared to output voltages V1, V2 of 1.62 mV for the cantilever with the free edges. Addition of the compliant joint to the cantilever reduced the resonant frequency of the cantilever from 12.038 kHz to 11.775 kHz, which was not considered significant.

Figure 4F:
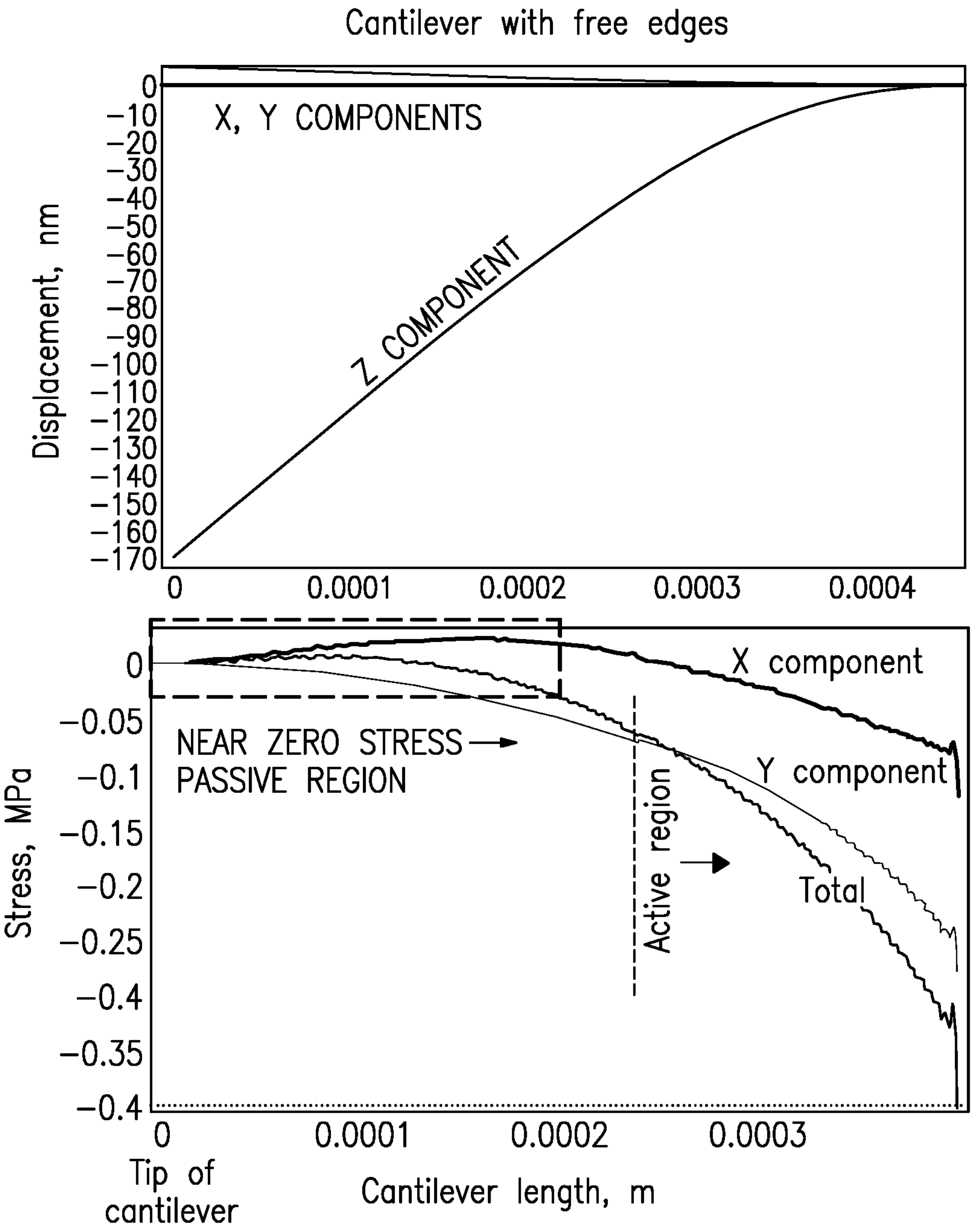
FIG. 4F illustrates curves showing results of simulations of displacement and stress along PMM cantilevers with free edges.
Figure 4G:
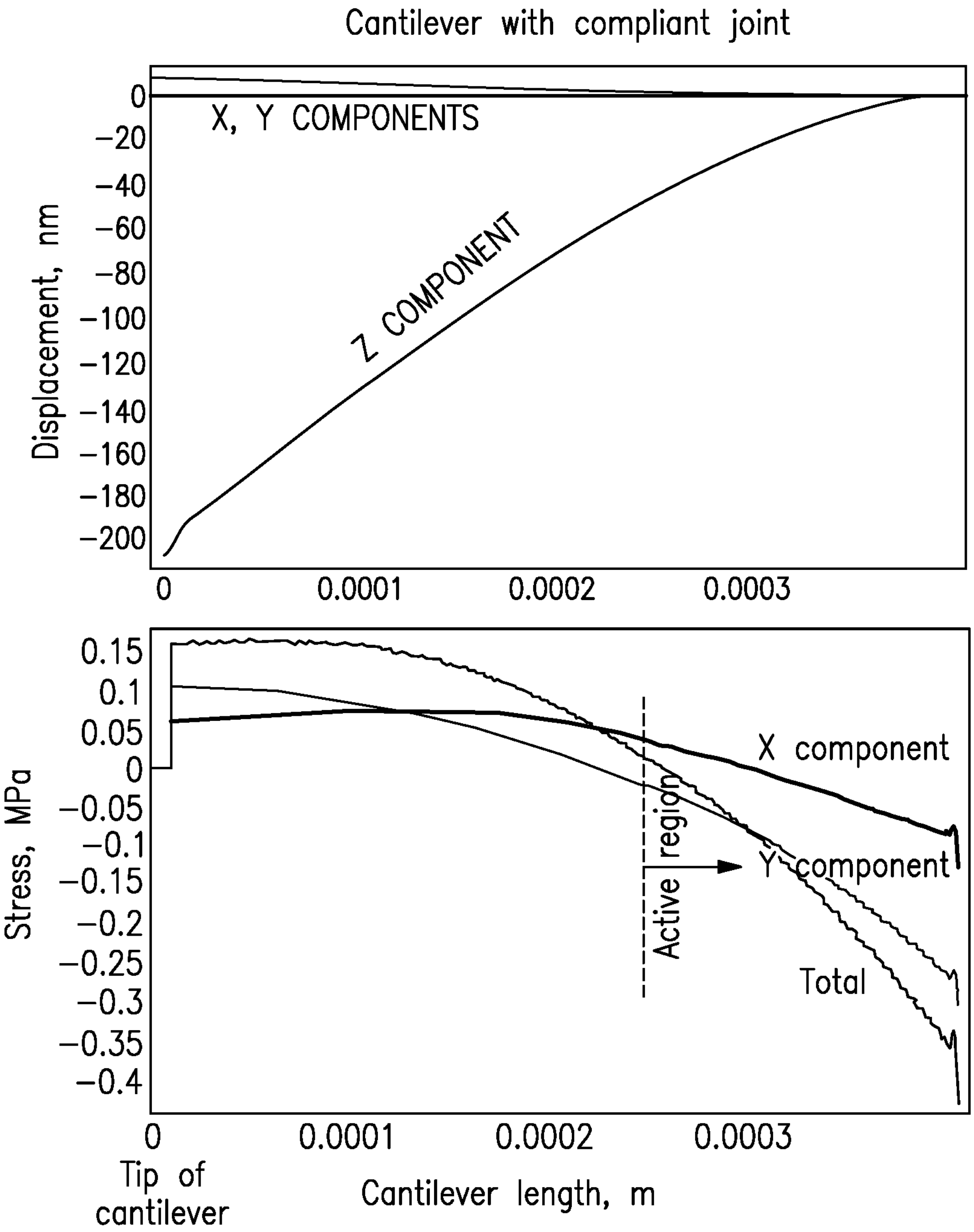
FIG. 4G illustrates curves showing results of simulations of displacement and stress along PMM cantilevers with compliant joints.

Curves showing results of simulations of displacement and stress along the cantilevers with free edges and the cantilevers with the PDMS in the gap regions (the compliant joint) are illustrated in FIGS. 4F and 4G, respectively. These curves illustrate the greater deflection of the cantilever with the compliant joint in the Z direction as compared to the deflection in the Z direction of the cantilever with the free edges. In the stress curves the area including the electrodes is indicated as the "active region." The cantilever with the compliant joint exhibited greater positive stresses in the X and Y axes proximate the tip of the cantilever as compared to the cantilever with the free edges. These stresses for both cantilevers became more negative along the length of the cantilevers toward their respective bases. In the cantilever including the compliant joint, because stress gradually changed from negative to positive values it may be possible to expand the active region to increase sensor performance. The passive regions of the cantilevers are considered to be the stress free (near 0 value) regions. In FIG. 4F this region is marked. For the new proposed design in FIG. 4G the stress near the tip of cantilever is no longer zero (0.15 MPa) and this region may thus also be used as an active region including sensing electrodes.

Additional simulations were performed to compare operating parameters of a cantilever PMM with a compliant joint as disclosed herein to those of a substantially similar cantilever PMM with free cantilever edges. Parameters simulated included −3 dB drop-off frequency, signal to noise ratio as a function of frequency, and noise voltage as a function of frequency. In the simulations the resistance of the openings between the cantilevers as modeled by an equivalent electric circuit BVD model was 40 mega-ohms for the cantilever with free edges and 400 mega-ohms for the cantilever with the compliant joints.

Figure 5A:
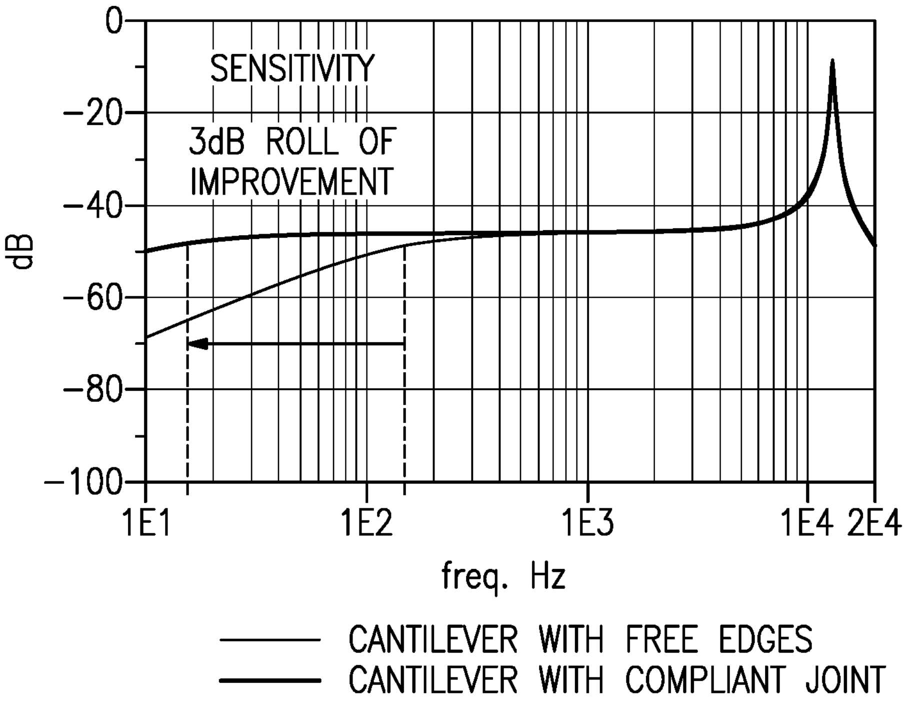
FIG. 5A illustrates a comparison of simulation results of the frequency responses of PMMs with free edges and with compliant joints.

FIG. 5A illustrates a comparison of the frequency responses of the two simulated PMMs. The PMM with compliant joints between cantilevers exhibit a significantly improved −3 dB roll-off frequency of about 20 Hz as compared to a −3 dB roll-off frequency of about 150 Hz for the PMM with cantilevers with free edges.

Figure 5B:
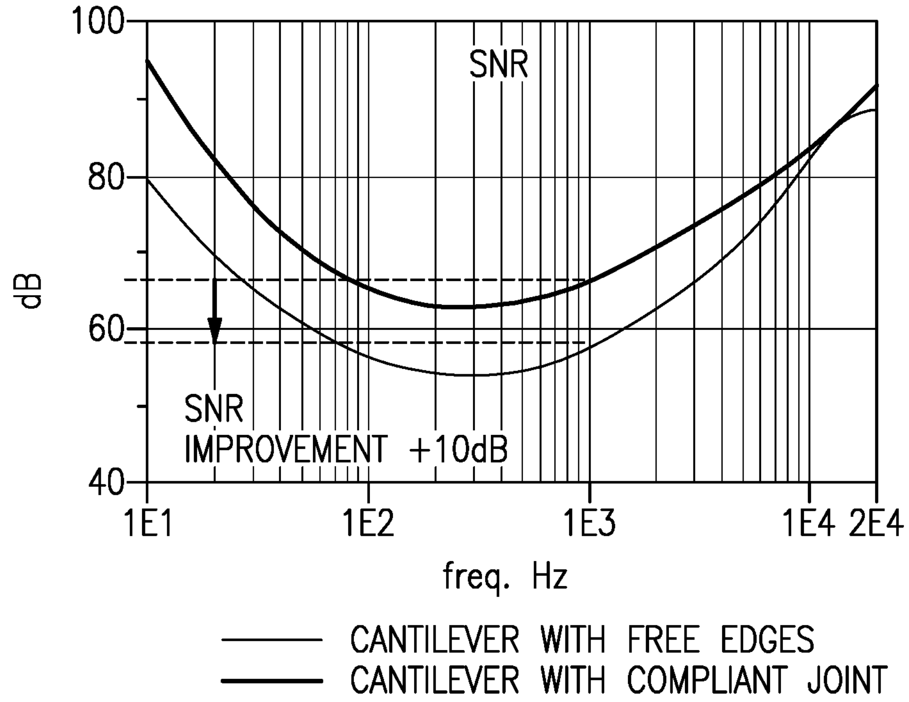
FIG. 5B illustrates a comparison of simulation results of signal to noise ratio of PMMs with free edges and with compliant joints.

The signal to noise ratio (SNR) of the PMM with the cantilevers with compliant joints was significantly improved as compared to the PMM with cantilever with free edges. This improvement was about 10 dB over a wide range of frequencies as shown in the chart of FIG. 5B.

Figure 5C:
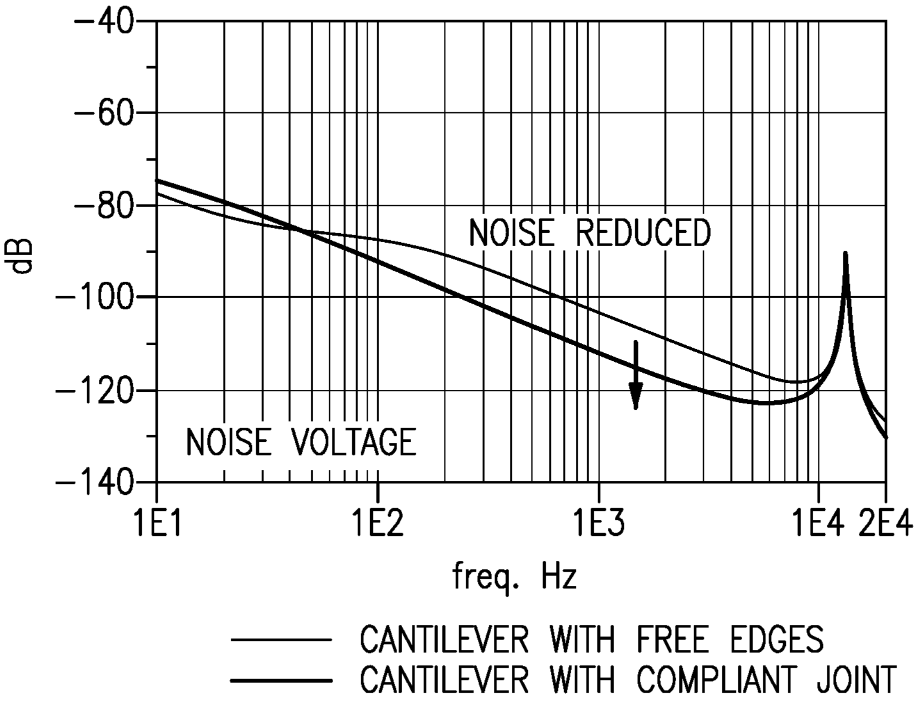
FIG. 5C illustrates a comparison of simulation results of noise voltage of PMMs with free edges and with compliant joints.
Figure 5D:
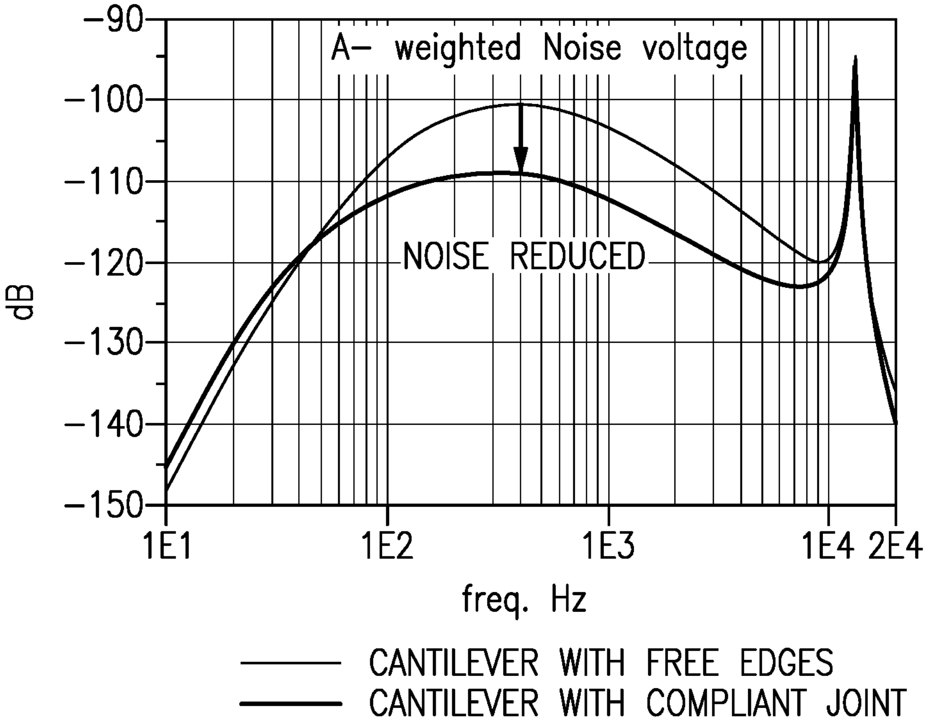
FIG. 5D illustrates a comparison of simulation results of A-weighted noise voltage of PMMs with free edges and with compliant joints.

The noise voltage of the PMM with the cantilevers with compliant joints was significantly improved (reduced) as compared to the PMM with cantilever with free edges as illustrated in FIG. 5C. This improvement is even more apparent when comparing the curves for the A-weighted noise voltage in FIG. 5D in which the noise voltage is weighted by the relative sensitivity of the human ear to various frequencies and more accurately depicts noise that might be perceived by a listener than the unweighted noise voltage curve as shown in FIG. 5C.

Figure 6A:
FIG. 6A illustrates an air gap between edges of adjacent cantilevers of an example of a PMM.
Figure 6B:
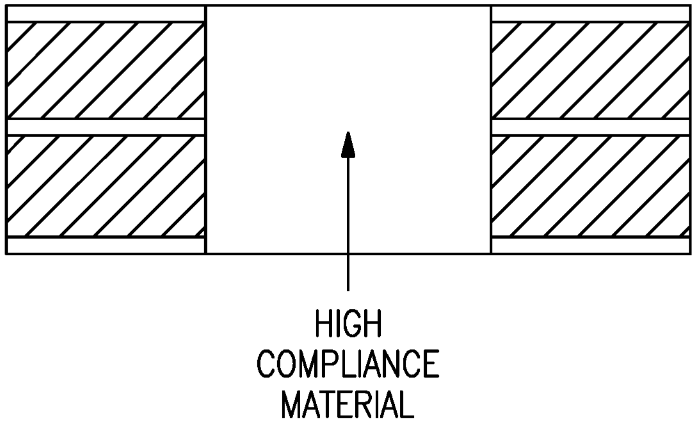
FIG. 6B illustrates compliant material having a first profile in the gap between edges of adjacent cantilevers of an example of a PMM.
Figure 6C:
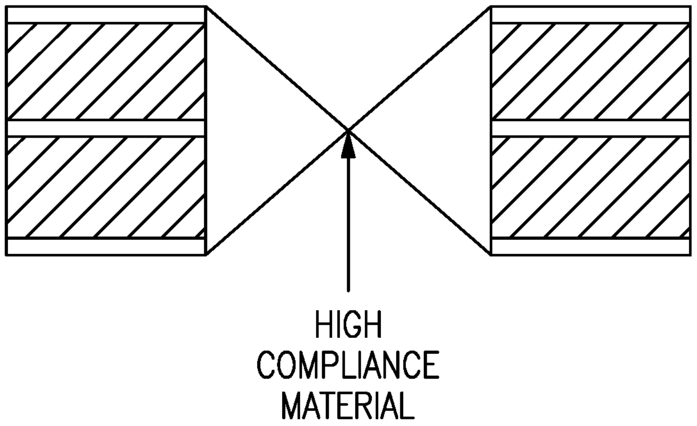
FIG. 6C illustrates compliant material having a second profile in the gap between edges of adjacent cantilevers of an example of a PMM.
Figure 6D:
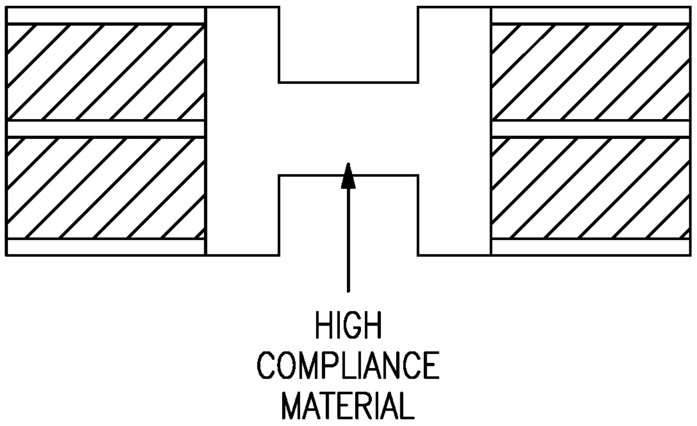
FIG. 6D illustrates compliant material having a third profile in the gap between edges of adjacent cantilevers of an example of a PMM.
Figure 6E:
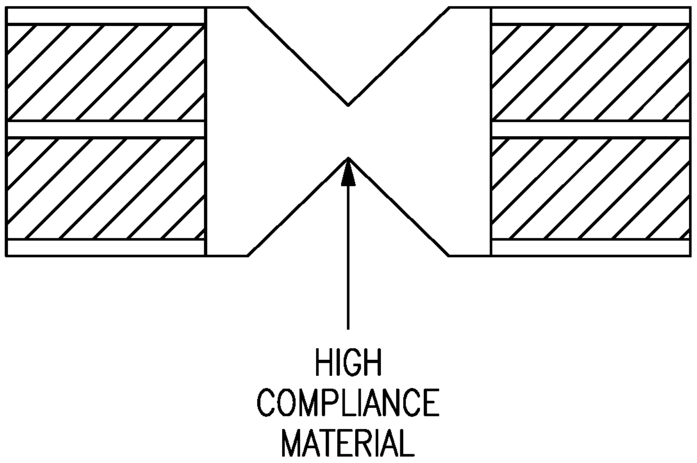
FIG. 6E illustrates compliant material having a fourth profile in the gap between edges of adjacent cantilevers of an example of a PMM.

The compliant material disposed between adjacent cantilevers in a cantilever PMM as disclosed herein may be formed in any of multiple different configurations. A typical air gap between edges of cantilevers in a cantilever PMM is illustrated in FIG. 6A. This air gap may be substantially or wholly filled with a high compliance material along at least a portion of the edges of adjacent cantilevers as shown in FIG. 6B such that the compliant material joint has a height the same as or substantially the same as the cantilever piezoelectric material/electrode stack. In other embodiments, the compliant material may be configured such that it decreases in height with distance into the gap, with maximum thicknesses at the edges of the cantilevers and a minimum thickness at the center of the gap. This decrease in thickness may be monotonic with distance into the gap between adjacent cantilevers as illustrated in FIG. 6C or the high compliance material may decrease in thickness in an arcuate or curved fashion with distance into the gap. In other embodiments, the compliant material may include flat outer portions and a notch about the center of the gap as illustrated in FIG. 6D or may include flat portions and portions that decrease in thickness with distance into the gap as illustrated in FIG. 6E.

Figure 6F:
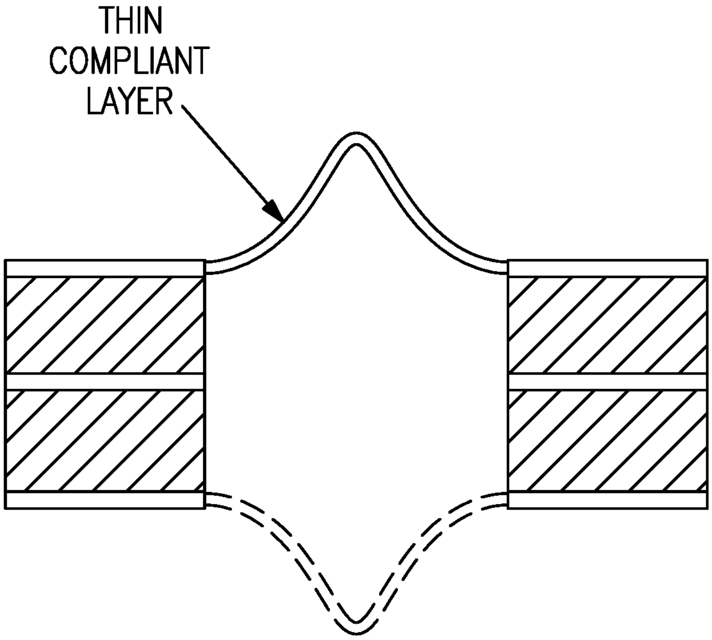
FIG. 6F illustrates compliant material in the form of a thin film in the gap between edges of adjacent cantilevers of an example of a PMM.
Figure 6G:
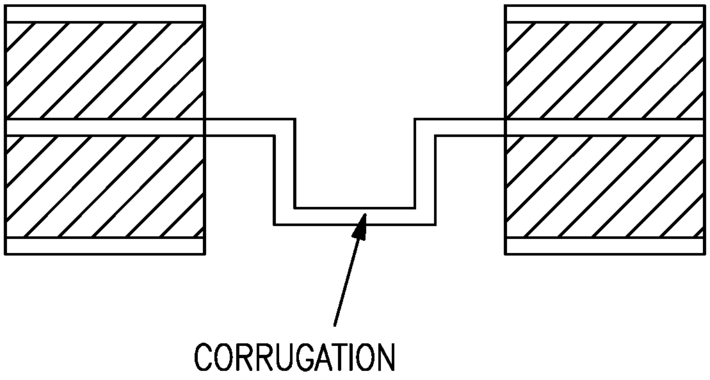
FIG. 6G illustrates compliant material in the form of a thin film with a corrugation in the gap between edges of adjacent cantilevers of an example of a PMM.

In further embodiments, as illustrate in FIG. 6F, the high compliance material may be in the form of a film or films that extend from the top and/or bottom of the edge of one cantilever to the top and/or bottom of the edge of an adjacent cantilever. The film or films may be polymeric (e.g., PDMS, silicone glue, resin, or low viscosity epoxy resin) or metallic, for example, a metal used for electrodes of the PMM (e.g., Al, Mo, Ru, etc.) Additionally or alternatively, the high compliance material may be formed as a film extending between edges of adjacent cantilevers and including one or more corrugations as illustrated in FIG. 6G. The film(s) may be attached to the front, back, or middle of the edges of the cantilevers as illustrated in FIGS. 6F and 6G.

Figure 7:
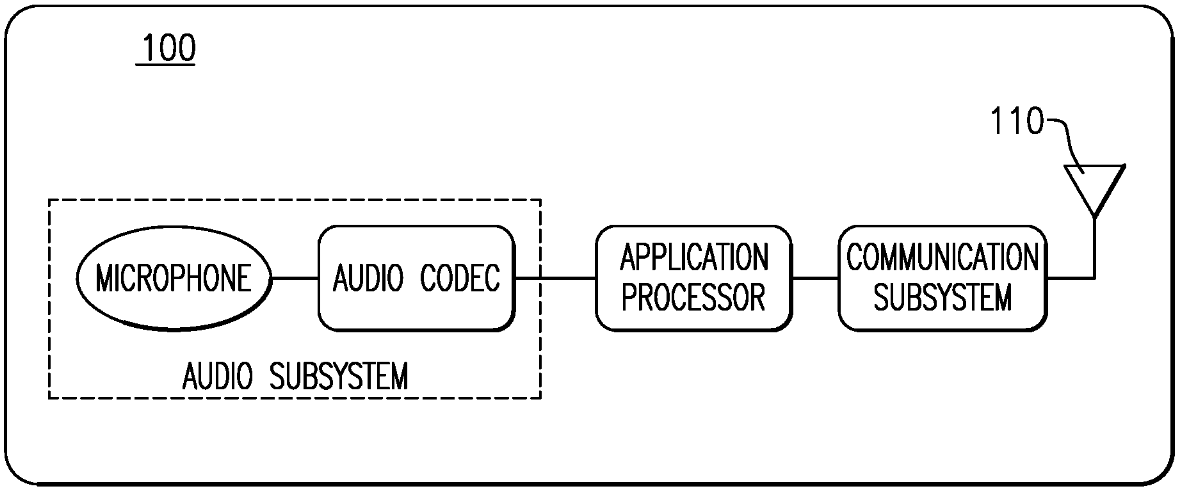
FIG. 7 is a block diagram of one example of a wireless device and that can include one or more PMMs according to aspects of the present disclosure.

Examples of MEMS microphones as disclosed herein can be implemented in a variety of packaged modules and devices. FIG. 7 is a schematic block diagrams of an illustrative device 100 according to certain embodiments.

The wireless device 100 can be a cellular phone, smart phone, tablet, modem, communication network or any other portable or non-portable device configured for voice or data communication. The wireless device 100 can receive and transmit signals from the antenna 110.

The wireless device 100 may include one or more microphones as disclosed herein. The one or more microphones may be included in an audio subsystem including, for example, an audio codec. The audio subsystem may be in electrical communication with an application processor and communication subsystem that is in electrical communication with the antenna 110. As would be recognized to one of skill in the art, the wireless device would typically include a number of other circuit elements and features that are not illustrated, for example, a speaker, an RF transceiver, baseband sub-system, user interface, memory, battery, power management system, and other circuit elements.

The principles and advantages of the embodiments can be used for any systems or apparatus, such as any uplink wireless communication device, that could benefit from any of the embodiments described herein. The teachings herein are applicable to a variety of systems. Although this disclosure includes some example embodiments, the teachings described herein can be applied to a variety of structures. Any of the principles and advantages discussed herein can be implemented in association with RF circuits configured to process signals in a range from about 30 kHz to 10 GHz, such as in the X or Ku 5G frequency bands.

Aspects of this disclosure can be implemented in various electronic devices. Examples of the electronic devices can include, but are not limited to, consumer electronic products, parts of the consumer electronic products such as packaged radio frequency modules, uplink wireless communication devices, wireless communication infrastructure, electronic test equipment, etc. Examples of the electronic devices can include, but are not limited to, a mobile phone such as a smart phone, a wearable computing device such as a smart watch or an ear piece, a telephone, a television, a computer monitor, a computer, a modem, a hand-held computer, a laptop computer, a tablet computer, a microwave, a refrigerator, a vehicular electronics system such as an automotive electronics system, a stereo system, a digital music player, a radio, a camera such as a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

Unless the context clearly requires otherwise, throughout the description and the claims, the words “comprise,” “comprising,” “include,” “including” and the like are to be construed in an inclusive sense, as opposed to an exclusive or exhaustive sense; that is to say, in the sense of “including, but not limited to.” The word “coupled”, as generally used herein, refers to two or more elements that may be either directly connected, or connected by way of one or more intermediate elements. Likewise, the word “connected”, as generally used herein, refers to two or more elements that may be either directly connected, or connected by way of one or more intermediate elements. Additionally, the words “herein,” “above,” “below,” and words of similar import, when used in this application, shall refer to this application as a whole and not to any particular portions of this application. Where the context permits, words in the above Detailed Description using the singular or plural number may also include the plural or singular number respectively. The word “or” in reference to a list of two or more items, that word covers all of the following interpretations of the word: any of the items in the list, all of the items in the list, and any combination of the items in the list.

Moreover, conditional language used herein, such as, among others, “can,” “could,” “might,” “may,” “e.g.,” “for example,” “such as” and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While certain embodiments have been described, these embodiments have been presented by way of example only and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. Any suitable combination of the elements and acts of the various embodiments described above can be combined to provide further embodiments. The accompanying claims and their equivalents are intended to cover such forms or modifications as would fall within the scope and spirit of the disclosure.

What is claimed is:

1. A piezoelectric microelectromechanical system microphone comprising:

a support substrate;

a membrane including a piezoelectric material attached to the support substrate and configured to deform and generate an electrical potential responsive to impingement of sound waves on the membrane, the membrane divided into a plurality of cantilevers having gaps between side edges of adjacent cantilevers, the membrane including an uppermost electrode disposed on an uppermost surface of the piezoelectric material and a lowermost electrode disposed on a lowermost surface of the piezoelectric material; and a compliant material disposed in at least a portion of the gaps between the adjacent cantilevers to improve performance of the piezoelectric microelectromechanical system microphone, the compliant material extending continuously vertically through the portion of the gaps between the adjacent cantilevers from a lower plane defined by a lower surface of the lowermost electrode to an upper plane defined by an upper surface of the uppermost electrode, all surfaces of the membrane above the uppermost electrode and below the lowermost electrode being free of the compliant material, a ventilation hole defined at a center of the membrane and portions of the gaps between the adjacent cantilevers extending radially outward from the ventilation hole being free of the compliant material.

2. The piezoelectric microelectromechanical system microphone of claim 1 wherein the compliant material is disposed within between 50% and 90% of a total area of the gaps between the adjacent cantilevers.

3. The piezoelectric microelectromechanical system microphone of claim 1 wherein the compliant material is a polymeric material.

4. The piezoelectric microelectromechanical system microphone of claim 3 wherein the compliant material includes one of polydimethylsiloxane, silicone glue, resin, or epoxy.

5. The piezoelectric microelectromechanical system microphone of claim 3 wherein the compliant material has a profile that decreases in thickness from edges of the adjacent cantilevers toward centers of the gaps between the adjacent cantilevers.

6. The piezoelectric microelectromechanical system microphone of claim 3 wherein the compliant material has a profile defining a notch about centers of the gaps between the adjacent cantilevers.

7. The piezoelectric microelectromechanical system microphone of claim 3 wherein the compliant material is in a form of a film coupled to one of fronts or rears of side edges of the adjacent cantilevers.

8. The piezoelectric microelectromechanical system microphone of claim 7 wherein the film is corrugated.

9. The piezoelectric microelectromechanical system microphone of claim 1 wherein the compliant material is a metal film.

10. The piezoelectric microelectromechanical system microphone of claim 9 wherein the film is coupled to one of fronts or rears of side edges of the adjacent cantilevers.

11. The piezoelectric microelectromechanical system microphone of claim 9 wherein the film is corrugated.

12. The piezoelectric microelectromechanical system microphone of claim 1 exhibiting a −3 dB roll-off frequency of about 20 Hz or less.

13. An electronics device module including the piezoelectric microelectromechanical system microphone of claim 1.

14. An electronic device including the electronic device module of claim 13.

15. A telephone including the electronic device module of claim 13.

16. A method of forming a piezoelectric microelectromechanical system microphone, the method comprising:

attaching a membrane including a piezoelectric material to a support substrate, the membrane configured to deform and generate an electrical potential responsive to impingement of sound waves on the membrane, the membrane divided into a plurality of cantilevers having gaps between side edges of adjacent cantilevers, the membrane including an uppermost electrode disposed on an uppermost surface of the piezoelectric material and a lowermost electrode disposed on a lowermost surface of the piezoelectric material; and disposing a compliant material in at least a portion of the gaps between the adjacent cantilevers to improve performance of the piezoelectric microelectromechanical system microphone, the compliant material extending continuously vertically through the portion of the gaps between the adjacent cantilevers from a lower plane defined by a lower surface of the lowermost electrode to an upper plane defined by an upper surface of the uppermost electrode, all surfaces of the membrane above the uppermost electrode and below the lowermost electrode being free of the compliant material, a ventilation hole defined at a center of the membrane and portions of the gaps between the adjacent cantilevers extending radially outward from the ventilation hole being free of the compliant material.

17. The method of claim 16 wherein the compliant material is disposed within between 50% and 90% of the total area of the gaps between the adjacent cantilevers.

18. The method of claim 16 wherein the compliant material is a polymeric material.

* * * * *